United States Patent
Guenther et al.

(10) Patent No.: US 9,450,902 B2
(45) Date of Patent: Sep. 20, 2016

(54) METHOD AND SYSTEM FOR MARKING EMAIL THREADS

(71) Applicant: Apple Inc., Cupertino, CA (US)

(72) Inventors: Carsten Guenther, San Francisco, CA (US); Cristobal Baray, Sunnyvale, CA (US); Stephen O. Lemay, San Francisco, CA (US); Tiffany S. Jon, Sunnyvale, CA (US); Lawrence Yang, San Francisco, CA (US); Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 253 days.

(21) Appl. No.: 14/292,305

(22) Filed: May 30, 2014

(65) Prior Publication Data

US 2015/0350142 A1    Dec. 3, 2015

(51) Int. Cl.
| | |
|---|---|
| *G06F 3/048* | (2013.01) |
| *H04L 12/58* | (2006.01) |
| *G06F 3/0482* | (2013.01) |
| *G06F 3/0484* | (2013.01) |

(52) U.S. Cl.
CPC ............. *H04L 51/22* (2013.01); *G06F 3/0482* (2013.01); *G06F 3/04842* (2013.01); *H04L 51/16* (2013.01); *H04L 51/24* (2013.01)

(58) Field of Classification Search
CPC ..... H04L 51/22; H04L 51/16; G06F 3/0482; G06F 3/04842
USPC .......................................................... 715/752
See application file for complete search history.

(56) References Cited

U.S. PATENT DOCUMENTS

| | | | | |
|---|---|---|---|---|
| 7,421,690 | B2* | 9/2008 | Forstall | H04L 12/58 707/999.2 |
| 8,839,139 | B2* | 9/2014 | Leukart | G06Q 10/109 715/759 |
| 8,949,283 | B1* | 2/2015 | Cornwell | 707/802 |
| 9,092,434 | B2* | 7/2015 | Kumar | G06F 17/30038 |
| 9,098,835 | B2* | 8/2015 | Runstedler | G06Q 10/107 |
| 9,152,307 | B2* | 10/2015 | Coleman | G06F 3/04842 |
| 9,152,377 | B2* | 10/2015 | Phillips | G06F 3/167 |
| 9,215,201 | B2* | 12/2015 | Bengochea | H04L 51/22 |
| 9,253,135 | B2* | 2/2016 | Nowakowski | H04L 51/24 |
| 9,282,587 | B2* | 3/2016 | Winkler | H04W 88/02 |
| 9,338,117 | B2* | 5/2016 | Banatwala | H04L 51/24 |
| 2012/0054642 | A1 | 3/2012 | Balsiger et al. | |
| 2012/0149342 | A1* | 6/2012 | Cohen | H04L 12/587 455/412.2 |
| 2013/0007139 | A1* | 1/2013 | Bombacino | G06Q 10/107 709/206 |
| 2013/0041968 | A1 | 2/2013 | Cohen et al. | |

(Continued)

FOREIGN PATENT DOCUMENTS

WO    WO2008061096    5/2008

OTHER PUBLICATIONS

Gmail Help page, Using labels, Mar. 11, 2014. (https://support.google.com/mail/answer/118708?hl=en).

(Continued)

*Primary Examiner* — David Phantana Angkool
(74) *Attorney, Agent, or Firm* — Downey Brand LLP

(57) ABSTRACT

Disclosed herein is a technique for marking email threads as important. When an email thread is marked as important, all email messages belonging to the email thread are marked as important in an email user interface. Also, notifications are generated for any incoming messages belonging to the email thread that has been marked as important.

20 Claims, 6 Drawing Sheets

(56) References Cited

U.S. PATENT DOCUMENTS

| | | |
|---|---|---|
| 2014/0046961 A1 | 2/2014 | Buchheit et al. |
| 2015/0350142 A1* | 12/2015 | Guenther .............. G06F 3/0482 715/752 |
| 2015/0350143 A1* | 12/2015 | Yang ....................... H04L 51/22 345/173 |
| 2016/0026352 A1* | 1/2016 | Brown .................. G06F 3/0484 715/752 |
| 2016/0026367 A1* | 1/2016 | Brown ................ G06F 3/04817 715/835 |
| 2016/0028875 A1* | 1/2016 | Brown .................. G06F 3/0481 715/751 |

OTHER PUBLICATIONS

PCT Application No. PCT/US2015/027920—International Search Report and Written Opinion dated Jul. 24, 2015.

\* cited by examiner

METHOD AND SYSTEM FOR MARKING EMAIL THREADS

FIELD

The described embodiments set forth a technique for marking an email thread as important and providing notifications when an email belonging to the email thread is received.

BACKGROUND

People in most organizations communicate with one another by exchanging email (electronic mail) messages. Since users receive a large number of email messages on a daily basis, there is a constant need to efficiently organize and display the email messages in a manner useful to the user. One way to organize the email messages is by grouping related email messages into email threads. For instance, email messages having the same subject can be determined to be related to one another and grouped into an email thread. In this manner, all the email messages in the user's mailbox can be organized into email threads.

Oftentimes, a user may consider a particular email thread to be important to the user. Current email clients allow a user to flag a particular important email message for later reference. However, the flagging is done on a per-message basis and does not take into consideration whether the message being flagged belongs to a thread, much less, whether the thread is important to the user. Consequently, there is a need for the user to be able to mark a particular thread as important such that user can be notified when an incoming email message belonging to the important thread is received.

SUMMARY

Representative embodiments set forth herein disclose various techniques for marking email threads. In particular, the embodiments set forth various techniques for allowing a user to mark a particular email thread as important. To allow the user to mark the email thread, the email client is configured to display a particular selectable graphical element (for example, icon, button, menu option, or other graphical element) in an email user interface. When the user selects the graphical element, all email messages belonging to the email thread are marked as important. The email client is also configured to generate notifications for any incoming messages belonging to the email thread that has been marked as important.

According to one embodiment, when an email thread is marked as important at one client device, information associated with the important email thread is synced with other client devices associated with the user. This allows the user to utilize any of his devices to 1) view and manage the important thread, and 2) receive notifications for any incoming messages belonging to the important thread. In one implementation, the information associated with the important email thread is synced by communicating unique identifying information for the important thread across the various client devices.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
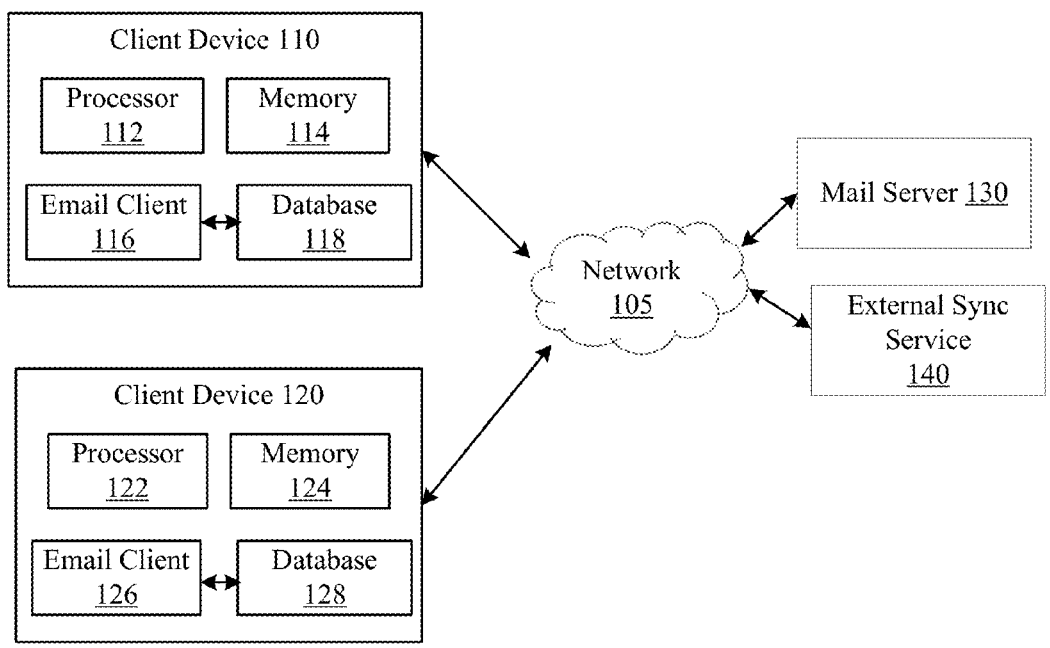
FIG. 1 illustrates a block diagram of different components of a system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Typically, various organizations utilize email clients to allow users to exchange emails. An email client is an application that enables a user to receive, compose, send, and organize emails. The email client can be used to organize email messages in various ways. For example, email messages can be sorted based on a particular field, placed in particular folders, grouped into email threads, etc. Email threads are generated by grouping two or more related email messages. The email client displays the email threads via an email user interface.

Oftentimes, a user may consider a particular email thread to be important to the user regardless of whether the email thread is originated by the user himself or by another user. While current systems allow a user to flag a particular single email message for later reference, this approach does not account for the fact that the message could be part of an email thread, much less, an email thread that is important to the user. Accordingly, the embodiments set forth herein provide various techniques for marking a particular email thread as important. When an email thread is marked important, notifications are generated for any incoming email messages belonging to the thread.

According to one embodiment and to achieve the foregoing techniques, the email client is configured to provide the user with an option to mark an email thread as important. For example, the email client may display a "mark thread" button (or other graphical element) in the email user interface that allows the user to mark the email thread as important when selected. In one implementation, the user can select a particular email message that belongs to the thread. The user can then select the "mark thread" button which causes all the email messages belonging to the thread to be marked as important in the email user interface. In another implementation, the user can select the "mark thread" button while composing a new email message to mark an outgoing thread as important.

According to one embodiment, the email client maintains a table of message identifiers (IDs) associated with email messages that belong to an email thread. In current systems, when an email message is deleted, all data and references about that message are removed from the database tables. However, according to one embodiment, the email client maintains the message IDs even if the email messages themselves are deleted. This allows the email client to continue to identify incoming email messages as belonging to a specific thread (and as such to an important thread), even if at that point no other message from that thread existed in the database. Accordingly, the user can continue to receive notifications for the incoming email messages even if previous email messages associated with the thread have been deleted.

According to another embodiment, information associated with an email thread that has been marked as important is synced across multiple client devices associated with the user. A subset of message IDs (e.g., message IDs of the most recently seen messages) associated with the important thread is used to identify the important thread across the multiple client devices. For an important thread, the email client generates some sort of fingerprint by storing the message IDs of the most recently seen messages belonging to such a thread. This is necessary because there is no universally agreed on standard (like uuid) to identify a thread like there is for individual email messages. As such, the subset of message IDs can be referred to as unique identifying information for the important thread across multiple client devices. This unique identifying information is communicated across multiple client devices which allows 1) email user interfaces associated with each of the client devices to be updated by marking the associated email messages as important, and 2) notifications to be generated for incoming email messages at each of the client devices.

Accordingly, the foregoing approaches provide techniques for marking email threads as important. A more detailed discussion of these techniques is set forth below and described in conjunction with FIGS. 1-6, which illustrate detailed diagrams of systems and methods that can be used to implement these techniques.

FIG. 1 illustrates a block diagram of different components of a system 100 that is configured to implement the various techniques described herein, according to some embodiments. More specifically, FIG. 1 illustrates a high-level overview of the system 100, which, as shown, includes client devices 110 and 120 that are associated with a user, a mail server 130, and an external sync service 140. The client devices 110, 120 are communicably coupled to the mail server 130 and the external sync service 140 via network 105. Network 105 can include one or more of the Internet, an intranet, a PAN (Personal Area Network), a LAN (Local Area Network), a WAN (Wide Area Network), a MAN (Metropolitan Area Network), a wireless communication network, and other network or combination of networks. While FIG. 1 illustrates two client devices associated with the user, system 100 can include any number of client devices without departing from the scope of the disclosure.

According to the illustration of FIG. 1, client devices 110, 120 can each include a processor 112/122, a memory 114/124, an email client 116/126, and a database 118/128 coupled to the email client 116/126. The processor 112, in conjunction with the memory 114, is configured to execute the email client 116 and/or other applications on the client device 110. Similarly, the processor 122, in conjunction with the memory 124, is configured to execute the email client 126 and/or other applications on the client device 120. Client devices 110, 120 can represent a computing device, such as, a personal computer, a portable computer, a workstation, a tablet computing device, a mobile computing device, and/or other computing device. The memory 114 can include a non-transitory computer readable storage medium configured to store instructions that, when executed by the processor 112 cause the client device 110/email client 116 to carry out the various techniques set forth herein. Similarly, the memory 124 can include a non-transitory computer readable storage medium configured to store instructions that, when executed by the processor 122 cause the client device 120/email client 126 to carry out the various techniques set forth herein.

Client devices 110, 120 are associated with the same user (i.e. used by or owned by the same user). For example, client device 110 can be a Mac computer and client device 120 can be an iPhone® or an iPad® by Apple®. Email client 116, 126 can represent an application that enables the user to receive, compose, send, and organize email messages. Email client 116, 126 is coupled to the database 118, 128 that stores received email messages. Email client 116, 126 is configured to run on a particular platform, such as an email client developed for a desktop operating system (e.g., Mac OS X, or other desktop operating system) or an email client developed for a mobile operating system (e.g., iOS, or other mobile operating system). The user can receive, compose, send, and organize email messages by utilizing email clients 116, 126 across multiple client devices 110, 120.

Email client 116, 126 is configured to communicate with the mail server 130 to send and receive email messages. The mail server 130 is configured to manage and store at least a portion of email messages associated with the user. The external sync service 140 is configured to synchronize email information (for example, information regarding an email thread indicated as being important) between multiple client devices 110, 120. The external sync service 140 can be part a cloud service (for example, iCloud™ by Apple®). In one implementation, the external sync service 140 can include iCloud's key value store (KVS) service. Information regarding important threads is synced among the multiple devices 110, 120 out-of-band via the external sync service 140 that belongs to iCloud (i.e., KVS). This allows the syncing feature to work across all email account types, such as, POP (Post Office Protocol), IMAP (Internet Message Access Protocol), and Exchange. Aside from few exceptions, the mail server 130 does not possess knowledge about email threads and the external sync service 140 is used to sync that information among the multiple client devices 110, 120.

Figure 2:
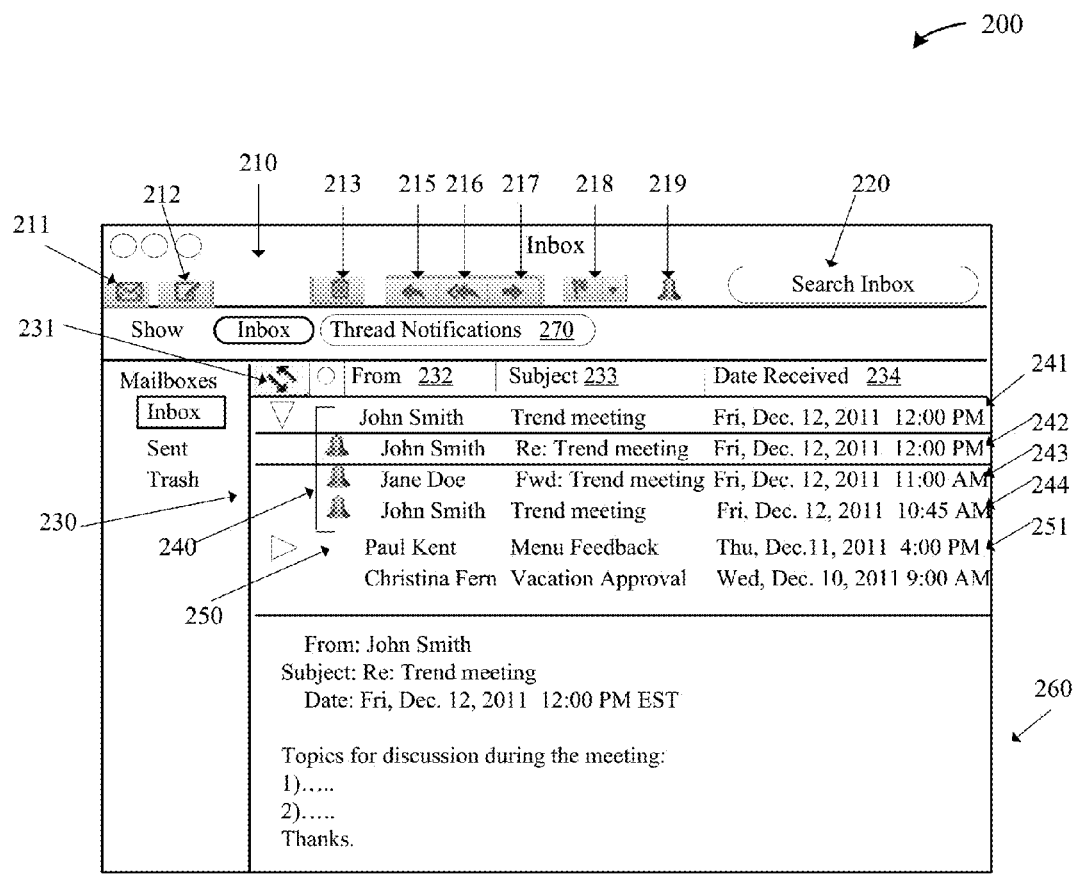
FIG. 2 illustrates an exemplary view of the user's inbox with a thread marked as important, according to some embodiments.

According to one embodiment, the email client 116, 126 provides an exemplary graphical user interface 200 for viewing email messages in the user's mailbox, as shown in FIG. 2. The email client 116, 126 organizes the email messages in the user's mailbox into email threads. For example, the user may have requested that the email messages be organized by thread (for example, by selecting a threading feature via a menu option provided by the email client 116, 126). Two or more email messages are considered to be part of a thread if the email messages are related to one another in some manner. For example, a current email message is part of a thread if it is a reply to or forward of a previous email message. In this case, the current email message and the previous email message form the thread. In another example, two or more email messages are considered to be part of a thread if they share the same subject. As illustrated in FIG. 2, the graphical user interface 200 provides a view of the user's inbox where the email messages are organized by thread.

In the illustrated view of FIG. 2, a top portion of the main window comprises a toolbar 210. Toolbar 210 comprises a get message button 211, a compose message button 212, a delete message button 213, a reply button 215, a reply all button 216, a forward button 217, a flag message button 218, a mark thread button 219, and a search field 220. The user can select the get message button 211 to get email messages from all accounts associated with the user. The user can select the compose message button 212 to compose a new message. The user can select the delete message button 213 to delete a particular selected message. The user can select the reply/reply all button 215, 216 to reply to a particular selected message. The user can select the forward button 217 to forward a particular selected message. The user can select the flag message button 218 to flag a particular selected message for later reference. The user can select the mark thread button 219 to mark a thread that a particular selected message belongs to as important. The search field 220 allows a user to search for email messages within a particular mailbox (for example, the inbox). Other buttons associated with other operations may be included in the toolbar 210. Also, other selectable graphical elements such as icons may be used instead of or in addition to the buttons, as will be appreciated.

The main window comprises a message list portion 230 that comprises a "Thread" column 231, a "From" column 232, a "Subject" column 233, and a "Date Received" column 234. The email messages in the message list portion 230 are sorted based on the "Date Received" column. Messages can be sorted based on the other columns, as will be appreciated. A particular email message 242 is currently selected and content associated with the selected message (e.g., text, attachments, links, etc.) is displayed in content portion 260.

The message list portion 230 includes a first thread 240 comprising a thread header 241. "Thread" column 231 includes an arrow (pointing down) next to the thread header 241 that indicates that an expanded view of the thread is being displayed. In the expanded view, email messages 242, 243, and 244 that belong to the first thread 240 are displayed under the thread header 241. The message list portion 230 includes a second thread 250 comprising a thread header 251. "Thread" column 231 includes an arrow (pointing to the right) next to the thread header 251 that indicates that a collapsed view of the thread is being displayed. In the collapsed view, only the thread header 251 is displayed and email messages belong to the second thread 250 are not displayed. Thread headers 241, 251 provide the user with information regarding the corresponding threads. For example, for the "From" column 232, the thread headers 241, 251 can include a name of a person who originated the corresponding thread. For the "Subject column 233, the thread headers 241, 251 can include the subject of the first email message in the corresponding thread. For the "Date Received" column 234, the thread headers 241, 251 can include the date associated with the most recently received email message in the corresponding thread. The header information for various columns displayed in FIG. 2 is exemplary and other information regarding the threads can be used for the thread headers 241, 251, as will be appreciated. While the email user interface shows email messages associated with important email threads being marked in the inbox, email messages in other folders such as sent, junk etc. can also be marked if they belong the important threads.

According to one embodiment, the user can select a particular email message, for example, message 242 in the message list portion 230. When the email message 242 is selected, content associated with the message is displayed in content portion 260. A user may select the mark thread button 219 that causes an existing thread (for example, the first thread 240) to be marked as important. In other words, selection of the mark thread button 219 marks the first thread 240 that the selected email message 242 belongs to as important. When the first thread 240 is marked as important, all the email messages 242, 243, and 244 in the first thread are also marked as important, as shown in FIG. 2, by including a "mark thread" icon next to the email messages. According to one embodiment, the user can right click on the selected message 242 that causes a menu of options to be displayed. The menu of options can include a mark thread option. The user can select the mark thread option to mark the first thread 240 as important.

When any new email messages (for example, replies, forwards, etc.) belonging to the first thread 240 are received, notifications are generated for the received email messages (by the email client 116, 126). In other words, the mark thread button 210 allows the user to mark a thread as important so that any new email messages that come in for that thread generate specific notifications for those new email messages. The notifications can be configured by the user. The user may configure the notifications via a settings menu that allows the user to select the type of notifications (for example, visual, audio, etc.) desired and the manner in which the notifications are to be displayed. For example, the user may select a specific ring tone for the notifications, a display style for the notifications (such as, banners or alerts), and/or other preferences for the notifications. A banner notification appears in the upper-right corner of a display screen of the client device for a short period of time. An alert notification, on the other hand, remains on the display screen until the user takes some action or dismisses the alert. The banner notification and/or the alert notification can include an icon identifying the application (e.g., email client) that generated the notification and a short message indicating that a new email message belonging to an important thread is received.

According to one embodiment, a separate mailbox 270 named "Thread Notifications" is created for the threads that are marked as important. The separate mailbox 270 allows the user to view only those threads (and associated email messages) that are marked as important. In other words, when the user selects the separate mailbox 270 from the toolbar, only important threads are displayed to the user. All the email messages belonging to important threads are collected in the separate mailbox 270. As such, the separate mailbox 270 provides a separate view for just the collected important threads.

Figure 3:
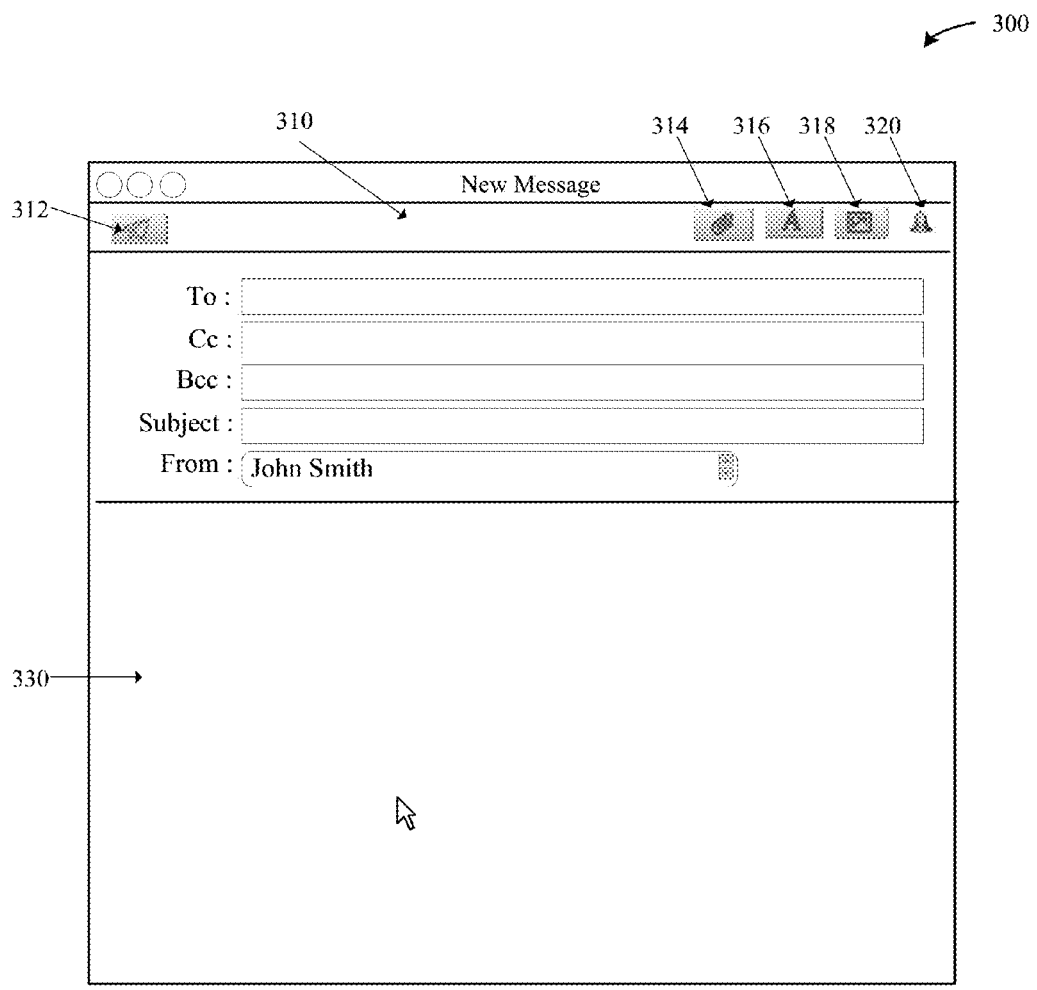
FIG. 3 illustrates an exemplary view of a new message window that allows the user to mark an outgoing thread as important, according to one embodiment.

According to one embodiment, the user can mark an outgoing thread as important when the user composes a new email message. When the user is the originator of a new thread, the user can select a mark thread button 320 displayed in a new message window 300 (as shown in FIG. 3) to mark the outgoing thread as important. The mark thread button 320 is included in a toolbar 310 of the new message window 300. As will be appreciated, the toolbar 310 includes other buttons, for example, a send button 312 for sending the email message, an attach document button 314 for selecting attachments to be included in a message body 330 of the email message, a show format bar button 316 for formatting the text included in the message body 320, a show/hide photo browser button 318 for selecting images/photos to be included in the message body 320 from a personal photo library, and/or other buttons. Other buttons associated with other operations may be included in the toolbar 310. Also, other selectable graphical elements such as icons may be used instead of or in addition to the buttons, as will be appreciated.

The user may compose a new email message that starts a completely new conversation (i.e., the new email message is not related to other email messages in the user's inbox). When the user selects the mark thread button 320 while composing the new email message, the thread that comes into being when any replies to the new email message are received will be marked important and the user notified accordingly. As will be appreciated, the mark thread button 320 can be provided in a reply window as well that allows the user can mark a thread as important while replying to a particular message. The thread may have been originated by another user but nonetheless considered important by the user.

According to one embodiment, a thread is identified based on a set or sample of message IDs associated with the email messages belonging to that thread. Every email message contains a header portion including a message ID. When the email message is a first email message in the thread (i.e., there are no messages before it in the thread), the header portion of the first email message includes a first message ID. When a reply to the first email message is received, the header portion of the reply includes the first message ID and a message ID associated with the reply. In this manner, a list of message IDs is generated over time as the conversation goes on which is carried along in the header portion of the message itself. In other words, a particular email message in a thread can include its own message ID and a set of message IDs associated with all email messages that occurred before that email message in the conversation. When a new email message is composed, the email client 116, 126 can generate a message ID for the message and include the message ID in the header portion of the message. When a reply to a previous message is composed, the email client 116, 126 can generate a message ID for the reply and include the message ID plus the message ID of the previous message (or message IDs associated with all previous messages) in the header portion of the reply. In this manner, the email client 116, 126 is able to map an incoming email message to an existing thread based on the header portion of the incoming message. For instance, if email messages associated with any of the message IDs included in the header portion exist in the user's mailbox, the incoming email message is mapped to an existing thread. Otherwise, the incoming email message may become part of a thread when the message is replied to.

According to one embodiment, the email client 116, 126 is communicably coupled the corresponding database 118, 128 that stores a message ID table. As the email client 116, 126 receives email messages associated with the user, the message IDs associated with the received email messages are stored in the message ID table. The message IDs are populated and maintained in the message ID table regardless of whether the corresponding email messages exist in the database 118, 128 or not. The message ID table maps message IDs to conversations/threads and is maintained on the client device 110, 120. The message ID table is pruned regularly to prevent it from growing indefinitely.

According to one embodiment, when a particular thread is marked as important, information associated with the important thread is communicated to the external sync service 140. For example, the external sync service 140 may receive the message IDs associated with the important thread. In one implementation, the message IDs associated with the important thread are marked in the message ID table in some manner. This allows the email client 116, 126 to track and maintain the message IDs associated with email messages belonging to an important thread.

Typically, when the user deletes an email message belonging to a thread, the corresponding email message and associated message ID is deleted from the email client 116, 126. In particular, the email message and associated message ID is deleted from the database 118, 128. So, if the user were to delete all previous email messages belonging to a thread, a subsequently received email message (which is related to the thread) is identified as a new message and not belonging to the thread. However, when the thread is marked as important, the message IDs associated with the email messages belonging to the thread are maintained in the message ID table even if the email messages themselves are deleted. This allows the message ID of a subsequently received email message to be compared against the message IDs in the table to determine whether the subsequently received email message belongs to an important thread. Thus, even if previous email messages associated with an important thread are deleted, the email client 116, 126 can still identify subsequently received messages as belonging to the thread based on the information maintained in the message ID table.

According to one embodiment, when the user marks a thread as important on one client device, this information is synced across all other client devices associated with the user (i.e., all devices that have a same user account (e.g., iCloud™ account) configured). A subset of message IDs associated with the thread is used to identify the thread across different client devices. In other words, the thread is identified based on the subset of message IDs in lieu of a separate unique id for the thread.

Figure 4:
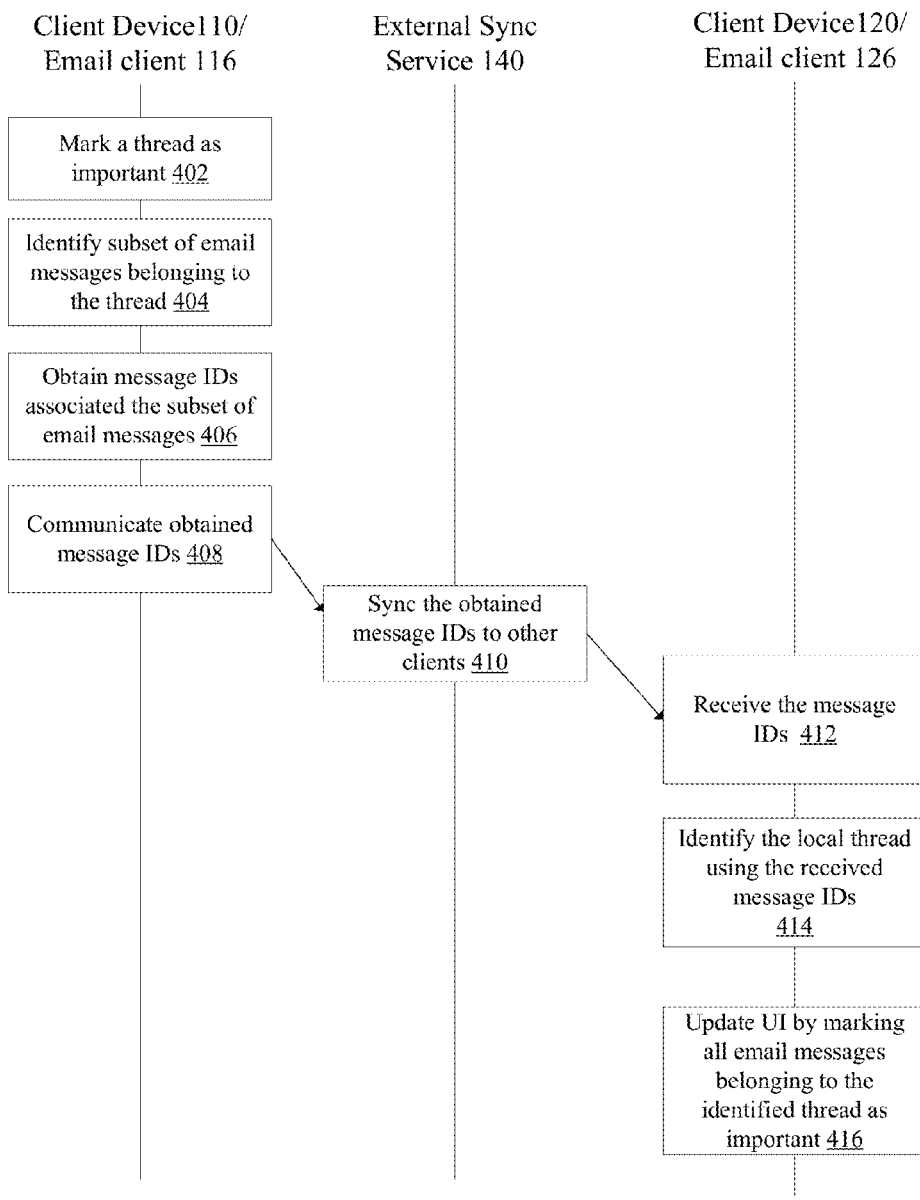
FIG. 4 illustrates an example flow of data in an example system for enabling information regarding an important thread to be synced across client devices, according to one embodiment.

FIG. 4 illustrates an example flow of data in an example system for enabling information regarding an important thread to be synced across two client devices, according to some embodiments. As shown, in an operation 402, the user may mark a thread as important via email client 116 on a first client device (i.e., client device 110). For example, the user can select a message belonging to the thread and select the mark thread button 219 to mark the thread as important. In an operation 404, the email client 116 can identify a subset of email messages belonging to the thread. In one implementation, the email client 116 identifies five most recent email messages belonging to the thread. In an operation 406, the email client 116 obtains message IDs associated with the subset of email messages. In other words, the email client 116 obtains a message ID associated with each email message in the subset. In an operation 408, the client device 110/email client 116 communicates the obtained message IDs to the external sync service 140. The email client 116 also communicates a last updated timestamp associated with the most recent email message in the thread.

In an operation 410, the external sync service 140 syncs information about the important thread to other client devices (i.e., client device 120). In other words, the obtained message IDs that are used to identify the important thread (referred to as unique identifying information for the important thread) are communicated to the client device 120.

In an operation 412, the email client 126 receives the message IDs from the external sync service 140. In an operation 414, the email client 126 identifies a local thread (corresponding to the thread marked as important at client 110) using the received message IDs. In one implementation, the email client 126 queries the user's mailbox (that stores the user's email messages on the client device 120) to determine whether email messages corresponding to the received message IDs exist in the mailbox. The email client 126 may make this determination by comparing the received message IDs with message IDs associated with email messages in the user's mailbox. The email client 126 identifies the local thread based on the comparison. In response to a determination that corresponding email messages exist (i.e., local thread exists), the email client 126 marks the email messages as important. In an operation 416, the email client 126 updates the email user interface by marking all email messages belonging to the identified thread as important. For example, the email client 126 can display the "mark thread" icon next to each of the email messages belonging to the identified thread. In response to a determination that the corresponding email messages do not exist in the mailbox, the email client 126 maintains the unique identifying information in memory (for example, memory 124 of client device 120). For example, the unique identifying information may be associated with a new thread and the email client 126 may not have fetched new email messages yet (i.e., the email client may not be aware of the thread yet). The next time that the email client 126 fetches email messages, the email client 126 may determine whether any of the fetched email messages correspond to the received message IDs. If they do, the email user interface may be updated in a similar manner.

In this manner, information regarding an important thread is synced across client device 110 and client device 120. Since both these devices are aware of the important threads, a newly received email message belonging to the important thread can cause a notification to be generated on any client device that the user is currently using. For example, the user may have marked the thread as important on his iPad®. The user may then access his email via the iPhone®. Not only will the important thread (i.e., email messages belonging to the thread) be appropriately marked on the iPhone®, the user will also be provided with notifications on the iPhone® when any new messages associated with the thread are received.

According to one embodiment, the unique identifying information is updated to contain the latest/freshest set of message IDs as new email messages belonging to the important thread are received over time. The unique identifying information can maintain N freshest message IDs to increase the likelihood of finding corresponding email messages in the user's mailbox. For example, if the user is using his iPhone® which is configured to fetch and display the first 150 email messages, there might be some previous message IDs (associated with earlier messages belonging to the thread) that the iPhone® is not aware of. In this scenario, there is a high probability that the iPhone® is aware of the freshest message IDs.

According to one embodiment, the user can un-mark the thread indicating that the thread is no longer important. The user can un-mark the thread by selecting a particular message belonging to the thread and clicking the mark thread button 219 again. In other words, mark thread button 219 can toggle between mark thread as important and mark thread as unimportant. When the mark thread button 219 is selected, the thread that the selected message belongs to is marked as unimportant and the "mark thread" icons can be removed from the email user interface (UI). Un-marking a thread removes the thread from the set of threads that are synced across multiple client devices 110, 120. A delete sync operation associated with one client device provides an indication for the other client devices that the thread was unmarked.

Figure 5:
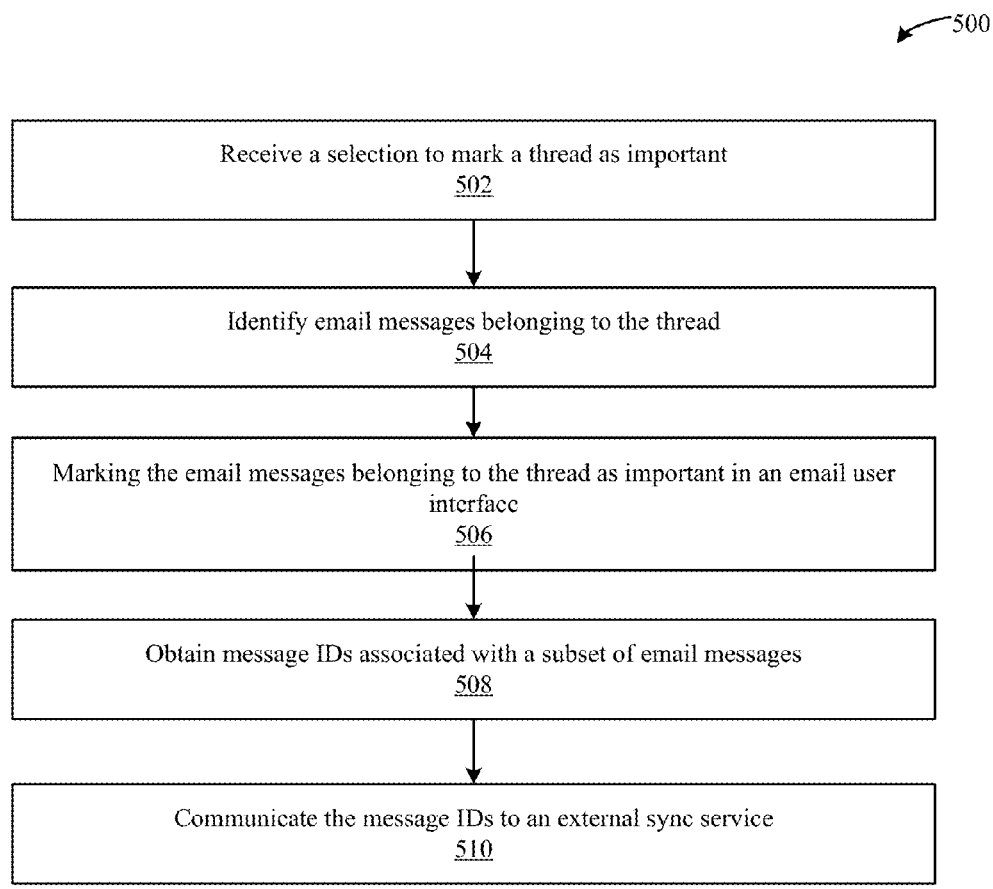
FIG. 5 illustrates a method that is carried out by an email client of a client device of FIG. 1, according to one embodiment.

FIG. 5 illustrates a method 500 that is carried out by an email client (for example, email client 116, 126 of FIG. 1) when a thread is marked as important, according to one embodiment. As shown, the method 500 begins at step 502, where the email client 116, 126 receives a selection to mark a thread as important from a user. For example, the user can select an email message belonging to the thread and select the mark thread button 219 to mark the thread as important.

At step 504, the email client 116, 126 identifies a plurality of email messages that belong to the thread that is marked as important. For example, the email client 116, 126 identifies email messages 242, 243, and 244 as belonging to the thread that is marked as important. At step 506, the identified email messages are marked as important in the email user interface. For example, the email messages 242, 243, and 244 are marked as important by including a "mark thread" icon next to the email messages (as shown in FIG. 2).

According to one embodiment, a subset of the email messages belonging to the thread is identified (for example, N most recent email messages). At step 508, the email client 116, 126 obtains message IDs associated with the subset of email messages. At step 510, the email client 116, 126 communicates the message IDs to the external sync service 140. The external sync service 140 syncs the message IDs across multiple client devices.

Figure 6:
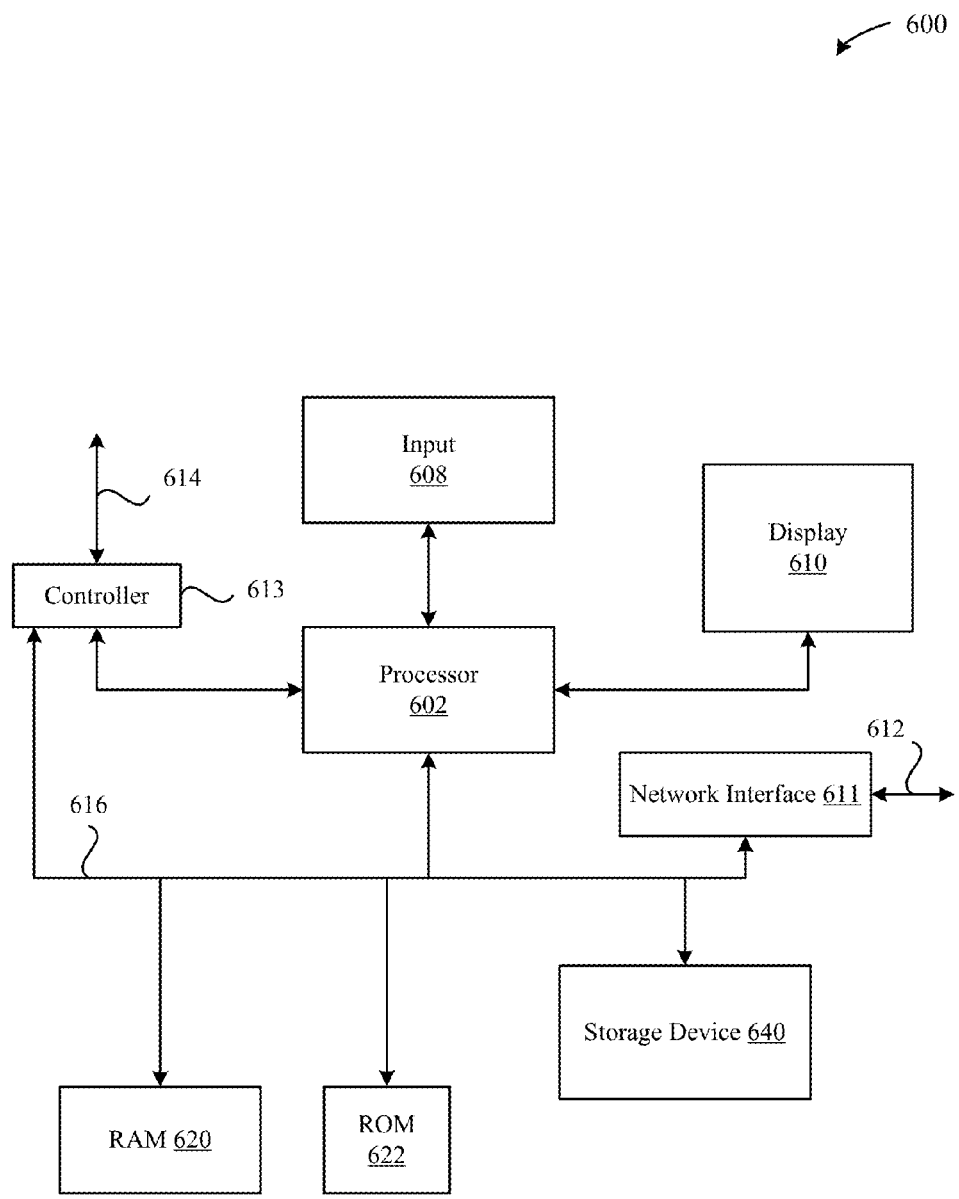
FIG. 6 illustrates a detailed view of a computing device that can be used to implement the various components described herein, according to some embodiments.

FIG. 6 illustrates a detailed view of a computing device 600 that can be used to implement the various components described herein, according to some embodiments. In particular, the detailed view illustrates various components that can be included in the client device 110, 120 illustrated in FIG. 1. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user (for example, email interface described herein). A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

The computing device 600 also include a storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing email threads, the method comprising, at a computing device:
   receiving a selection to mark an email thread as important;
   identifying a plurality of email messages associated with the email thread;
   marking each email message of the plurality of email messages as important;
   establishing, for each email message included in a subset of email messages from the plurality of email messages, a respective unique identifier for the email message;
   providing, for each mail message included in the subset of email messages, the respective unique identifier to a synchronization entity;
   receiving a new email message associated with the email thread; and
   in response to the new email message:
      marking the new email message as important,
      establishing a respective unique identifier for the new email message,
      providing the respective unique identifier to the synchronization entity, and
      generating a notification that indicates the new email message is received and is marked as important.

2. The method of claim 1, wherein receiving the selection comprises:
   receiving a first selection of an existing email message belonging to an existing email thread; and
   receiving a second selection of a graphical element to mark the existing email thread as important.

3. The method of claim 1, wherein receiving the selection comprises:
   receiving an input at a graphical element associated with an outgoing email message that indicates the outgoing email message is important.

4. The method of claim 1, wherein marking each email message of the plurality of email messages as important comprises adding an icon next to the email message that indicates the email message is important.

5. The method of claim 1, wherein the subset of email messages represents a specific number of most recently received email messages associated with the email thread.

6. The method of claim 1, wherein the computing device is associated with a user account, and the synchronization entity manages the computing device and at least one other computing device associated with the user account.

7. The method of claim 6, wherein the synchronization entity provides, to the at least one other computing device, the respective unique identifiers established for the subset of email messages.

8. The method of claim 7, wherein each of the respective unique identifiers enable the at least one other computing device to identify that the email thread is marked as important.

9. The method of claim 1, wherein the notification is configurable, and the notification comprises a visual alert and/or an audio alert.

10. The method of claim 1, further comprising, in response to the selection:
    establishing a thread notifications mailbox, wherein the thread notifications mailbox includes the plurality of email messages associated with the email thread, and further includes email messages associated with any other email threads that are marked as important.

11. A computing device configured to mark email threads, the computing device comprising:
    a processor; and
    a storage medium configured to store instructions that, when executed by the processor, cause the computing device to carry out steps that include:
       receiving a selection to mark an email thread as important;
       identifying a plurality of email messages associated with the email thread;
       marking each email message of the plurality of email messages as important;
       establishing, for each email message included in a subset of email messages from the plurality of email messages, a respective unique identifier for the email message;
       providing, for each mail message included in the subset of email messages, the respective unique identifier to a synchronization entity;

receiving a new email message associated with the email thread; and in response to the new email message:
- marking the new email message as important,
- establishing a respective unique identifier for the new email message,
- providing the respective unique identifier to the synchronization entity, and
- generating a notification that indicates the new email message is received and is marked as important.

12. The computing device of claim 11, wherein receiving the selection comprises:
- receiving a first selection of an existing email message belonging to an existing email thread; and
- receiving a second selection of a graphical element to mark the existing email thread as important.

13. The computing device of claim 11, wherein receiving the selection comprises:
- receiving an input at a graphical element associated with an outgoing email message that indicates the outgoing email message is important.

14. The computing device of claim 11, wherein marking each email message of the plurality of email messages as important comprises adding an icon next to the email message that indicates the email message is important.

15. The computing device of claim 11, wherein the subset of email messages represents a specific number of most recently received email messages associated with the email thread.

16. The computing device of claim 11, wherein the computing device is associated with a user account, and the synchronization entity manages the computing device and at least one other computing device associated with the user account.

17. The computing device of claim 16, wherein the synchronization entity provides, to the at least one other computing device, the respective unique identifiers established for the subset of email messages.

18. The computing device of claim 17, wherein each of the respective unique identifiers enable the at least one other computing device to identify that the email thread is marked as important.

19. The computing device of claim 11, wherein the steps further include, in response to the selection:
- establishing a thread notifications mailbox, wherein the thread notifications mailbox includes the plurality of email messages associated with the email thread, and further includes email messages associated with any other email threads that are marked as important.

20. A non-transitory computer readable storage medium configured to store instructions that, when executed by a processor included in a computing device, cause the computing device to manage email threads, by carrying out steps that include:
- receiving a selection to mark an email thread as important;
- identifying a plurality of email messages associated with the email thread;
- marking each email message of the plurality of email messages as important;
- establishing, for each email message included in a subset of email messages from the plurality of email messages, a respective unique identifier for the email message;
- providing, for each mail message included in the subset of email messages, the respective unique identifier to a synchronization entity;
- receiving a new email message associated with the email thread; and
- in response to the new email message:
  - marking the new email message as important,
  - establishing a respective unique identifier for the new email message,
  - providing the respective unique identifier to the synchronization entity, and
  - generating a notification that indicates the new email message is received and is marked as important.

* * * * *